DAVID L. STILES.

Improvement in Heating Stoves.

No. 4,595. Reissued Oct. 17, 1871.

Witnesses
Arch. Paine
W S Redfield

Inventor
David L Stiles,
By Burke Fraser & Dyer
Attys.
Rochester N.Y.

AM. PHOTO-LITHOGRAPHIC CO. N.Y. (OSBORNE'S PROCESS.)

UNITED STATES PATENT OFFICE.

JOHN M. FRENCH, JR., OF ROCHESTER, NEW YORK, ASSIGNEE, BY MESNE ASSIGNMENTS, OF DAVID L. STILES.

IMPROVEMENT IN HEATING-STOVES.

Specification forming part of Letters Patent No. 40,663, dated November 17, 1863; reissue No. 4,004, dated May 31, 1870; reissue, No. 4,595, October 17, 1871.

*To all whom it may concern:*

Be it known that I, DAVID L. STILES, of the city of Rochester, in the county of Monroe and State of New York, have invented a certain new and useful Improvement in Stoves, of which the following is a specification:

This invention consists in combining with a stove having a cylindrical body revertible flues located directly within the cylinder, and so arranged that an oblong fire-chamber is secured; said flues also so arranged as to carry the products of combustion downward into a hollow bottom or base of the stove before being discharged into the smoke-pipe. It also consists in the construction of the flue-plate or plates of the stove; and, furthermore, in the construction of the register, as hereinafter described.

Figure 1:
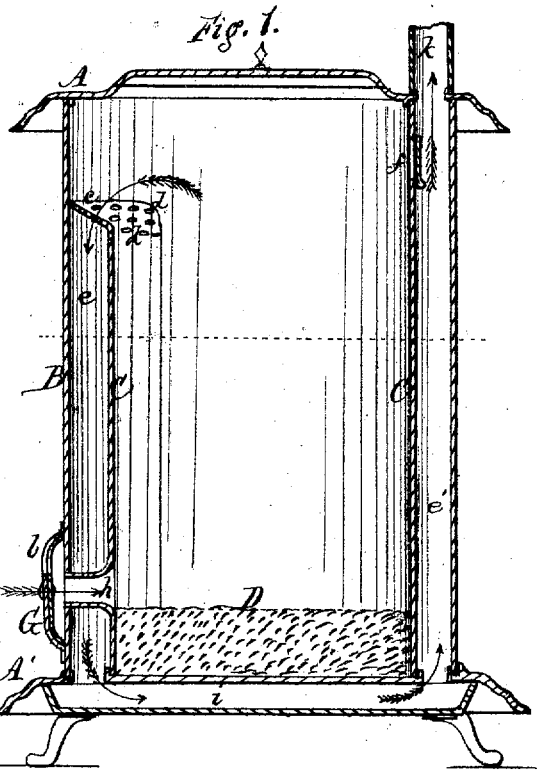
Figure 2:
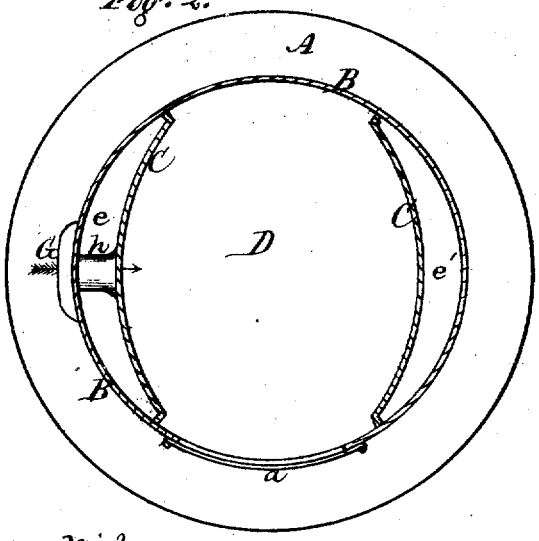
Figure 3:
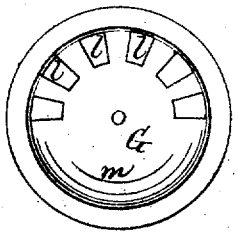
Figure 4:
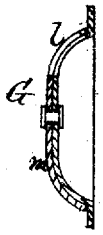

In the drawing, Figure 1 is a central vertical section of my improved stove, and Fig. 2 a transverse horizontal section of the same; Figs. 3 and 4 a front elevation and vertical section, respectively, of the register.

The top and bottom A A′ are preferably made of cast-iron. The top is provided with a cover of such size as to allow large sticks of wood to enter, and is preferably pivoted on one side so as to swing off. The upper and lower parts are connected by an ordinary sheet-iron cylinder, B, of suitable size, which may be provided on one side with a door, *a*, for the entrance of fuel. Revertible flues *e e′* are located inside this cylinder, which connect with a hollow flue-space, *i*, in the base of the stove. The flue *e* is the induction-flue, and takes the heat and products of combustion at a suitable height and conducts them down into space *i*, where they are distributed over the whole bottom. The flue *e′* is the eduction-flue, and conducts said heat and products of combustion from space *i* upward into the smoke-pipe *k*, when it finally escapes. I form these flues by a plate or plates, C, which are secured within the body of the cylinder so as to cut off a portion of the space of the same to form the flues.

I gain a double advantage by this, viz.: I avoid making flue-pipes outside the cylinder, which had been previously done, and I furnish a fire-surface covering the flues, which is effective in imparting heat over a large extent, and which prevents burning out. The great advantage I secure in this part of my invention, however, is that I enable revertible flues to be used in a cylinder-stove directly within the body of the cylinder, and occupying a portion of the cylinder-space, and yet gain the advantage of retaining an oblong fire-chamber, D. This is desirable in wood-stoves, especially since the cylinder of the stove cannot be made of very large size. The flue-plate or plates C may be located in such a position as is desired, by which the fire-chamber is retained of oblong shape. This arrangement of the flues within the cylinder secures economy of space, and preserves symmetry of form of the cylinder, which cannot be the case where flue-pipes or other devices are used outside.

The plate or that portion of the same which covers the induction-flue has a deflection or turn, *c*, which abuts with the cylinder, and at this point are made holes or openings *d d* (Fig. 1) for the passage of the heat and products of combustion into flue *e*. The exit-flue *e′* is entirely cut off from the fire-chamber so as to lead directly to the smoke-pipe. A passage, *f*, is made, however, near the upper end, to allow a direct draught, when desired; but this is covered by a valve or damper. At a suitable height from the bottom is made a small pipe or induction-opening, *h*, for the admission of air to support the combustion, which opening is covered by a register. The pipe is formed in one piece with the flue-plate, and fitted by cutting a hole to receive it in the outer cylinder. The register G, covering the opening, is of a peculiar kind. The ordinary circular pivoted register has its holes for the admission of air arranged around its whole circumference and extending to the center, having only room for the pivot. In my invention these holes *l l* are made only in the upper portion of the register, and their length occupying only half the radius, leaving the lower half *m* entirely closed or imperforated, as shown clearly in Figs. 3 and 4. The relative position of this register with the air-pipe *n* is such that its closed or imperforated part *m* comes opposite the opening of the air-pipe, while the register-holes *l l* are situated above the same, as in Fig. 1. The object of this arrangement is to keep the sparks and coals that snap from the fuel from passing into the room, as they would do if register-holes were made in the lower part of the register. The coals strike the closed part and fall within the register. This arrangement also prevents the passage of ashes outward to the floor.

I do not claim, broadly, revertible flues in stoves, as I am aware that they are old; but

What I claim, and desire to secure by Letters Patent, is—

1. In combination with a stove having a cylindrical body, B, revertible flues located directly within and inclosed by the cylinder, but partitioned from the cylinder-space, said flues connecting with the hollow bottom *i*, by which a circuit is produced, and the whole so arranged as to form an oblong fire-chamber within the cylinder, for the purpose specified.

2. The flue-plate C, constructed with the draught-pipe *h*, formed in one piece, said pipe opening through the cylinder, as herein described.

3. The register G having air-holes *l l* only in the upper portion, and its closed part *m* situated opposite the draught-opening of the stove, substantially as and for the purpose set forth.

In witness whereof I have hereunto set my hand this 26th day of June, 1871, in presence of two subscribing witnesses.

DAVID L. STILES.

Witnesses.
R. F. OSGOOD,
ARCHD. BARNES.

(154)